United States Patent
Nakamura et al.

(10) Patent No.: US 12,063,336 B2
(45) Date of Patent: Aug. 13, 2024

(54) IMAGE FORMING APPARATUS, METHOD, AND COMPUTER PRODUCT FOR TEST PRINTING A SPECIAL COLOR AREA

(71) Applicant: CANON KABUSHIKI KAISHA, Tokyo (JP)

(72) Inventors: Sho Nakamura, Tokyo (JP); Takashi Kikuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/523,626

(22) Filed: Nov. 29, 2023

(65) Prior Publication Data
US 2024/0179264 A1 May 30, 2024

(30) Foreign Application Priority Data

Nov. 30, 2022 (JP) .................................. 2022-192354
Oct. 2, 2023 (JP) .................................. 2023-171668

(51) Int. Cl.
*H04N 1/60* (2006.01)
*B41J 2/21* (2006.01)
*H04N 1/00* (2006.01)

(52) U.S. Cl.
CPC .......... *H04N 1/6038* (2013.01); *B41J 2/2107* (2013.01); *H04N 1/605* (2013.01); *H04N 1/00413* (2013.01); *H04N 1/0045* (2013.01)

(58) Field of Classification Search
CPC ........ H04N 1/54; H04N 1/56; H04N 1/00413; H04N 1/0045; H04N 1/60–6097; B41J 2/2107
See application file for complete search history.

(56) References Cited

U.S. PATENT DOCUMENTS

| | | | | |
|---|---|---|---|---|
| 8,737,850 | B2* | 5/2014 | Umeda | H04N 1/00015 399/15 |
| 10,015,365 | B2* | 7/2018 | Robinson | H04N 1/00082 |
| 11,019,235 | B2* | 5/2021 | Suzuki | H04N 1/6027 |
| 11,677,892 | B2* | 6/2023 | Tashiro | H04N 1/00023 358/1.1 |
| 2004/0032602 | A1* | 2/2004 | Teraue | H04N 1/6011 358/1.9 |
| 2010/0171992 | A1 | 7/2010 | Pinney | |
| 2017/0034399 | A1 | 2/2017 | Yamanouchi | |

FOREIGN PATENT DOCUMENTS

| | | |
|---|---|---|
| JP | 2012073605 A | 4/2012 |
| JP | 2021002817 A | 1/2021 |
| JP | 2021187083 A | * 12/2021 |

* cited by examiner

*Primary Examiner* — Scott A Rogers
(74) *Attorney, Agent, or Firm* — Canon U.S.A., Inc. I.P. Division

(57) ABSTRACT

An image forming apparatus performs printing of only a special color area by extracting an area to which a special color ink is to be applied or an area to which a decorative printing, such as a texture, is to be performed and not applying ink on an area other than the extracted area.

15 Claims, 12 Drawing Sheets

FIG.3

| | JOB LIST | | | |
|---|---|---|---|---|
| DOCUMENT NAME | NUMBER OF PAGES | NUMBER OF COPIES | PAPER TYPE | |
| Document1 | 100 | 1 | PET | MENU FOR TEST PRINTING *302* |
| Document2 | 10 | 50 | PLAIN PAPER | |
| | | | | PRINT *303* |

*301* — Document1 row

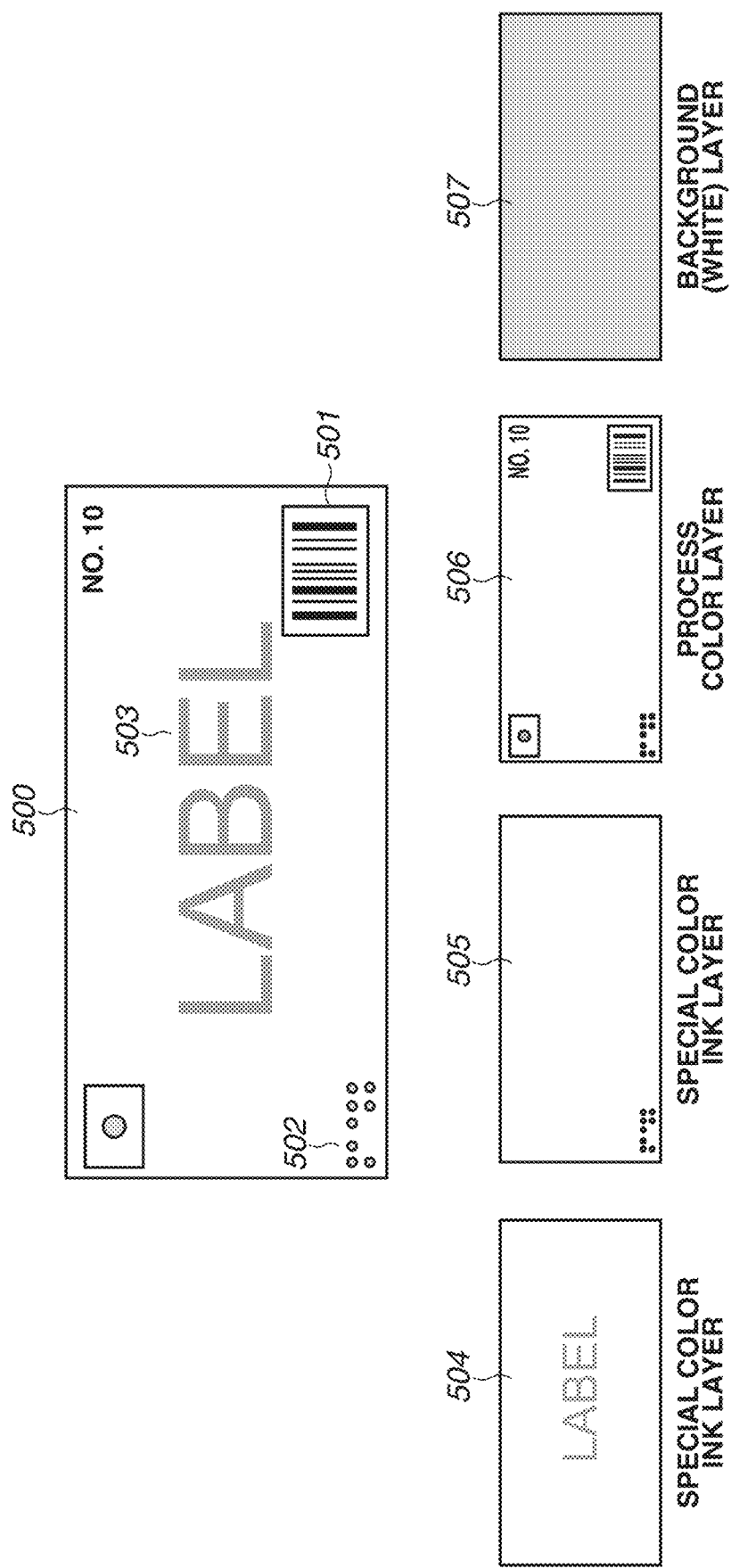

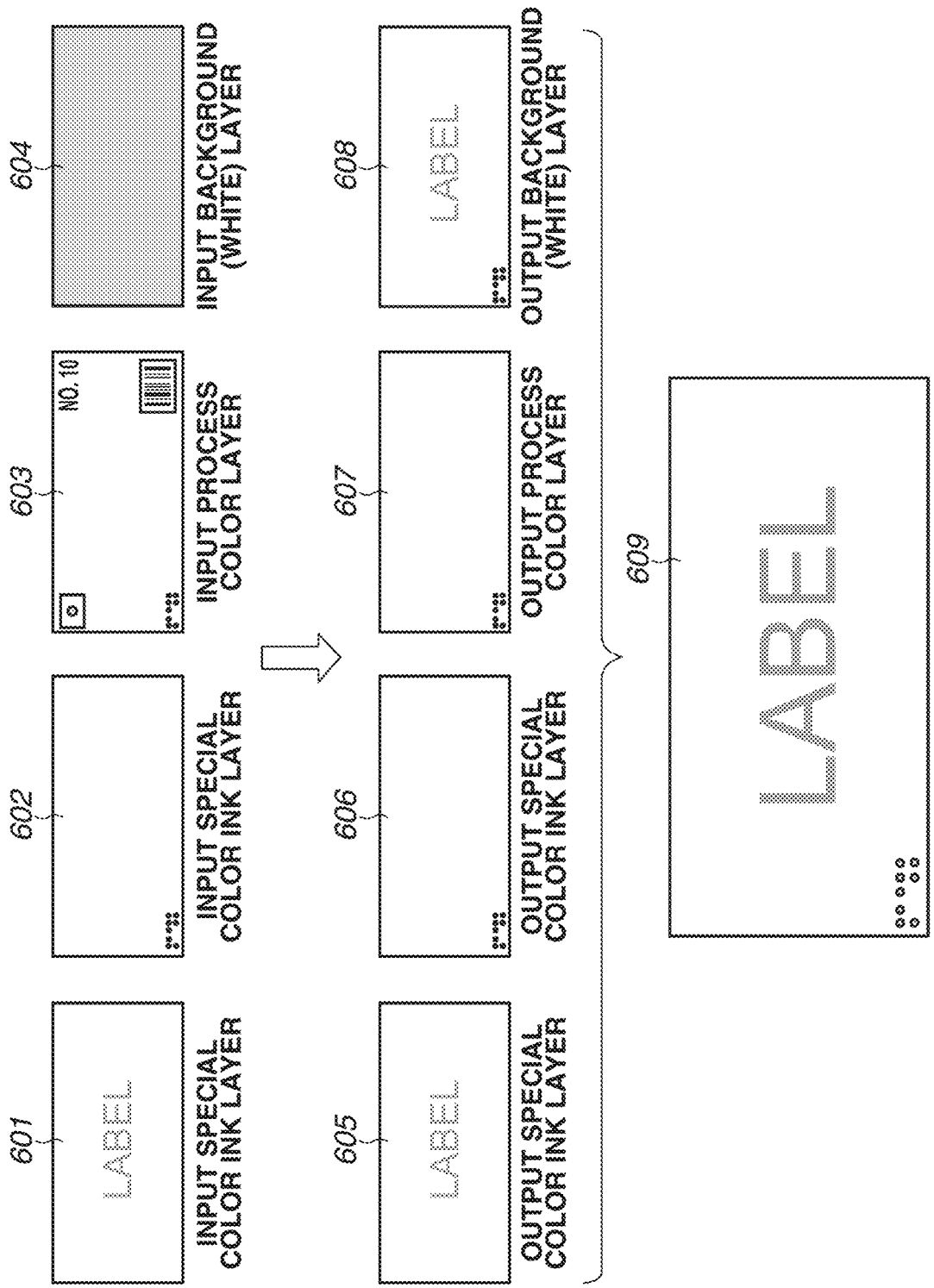

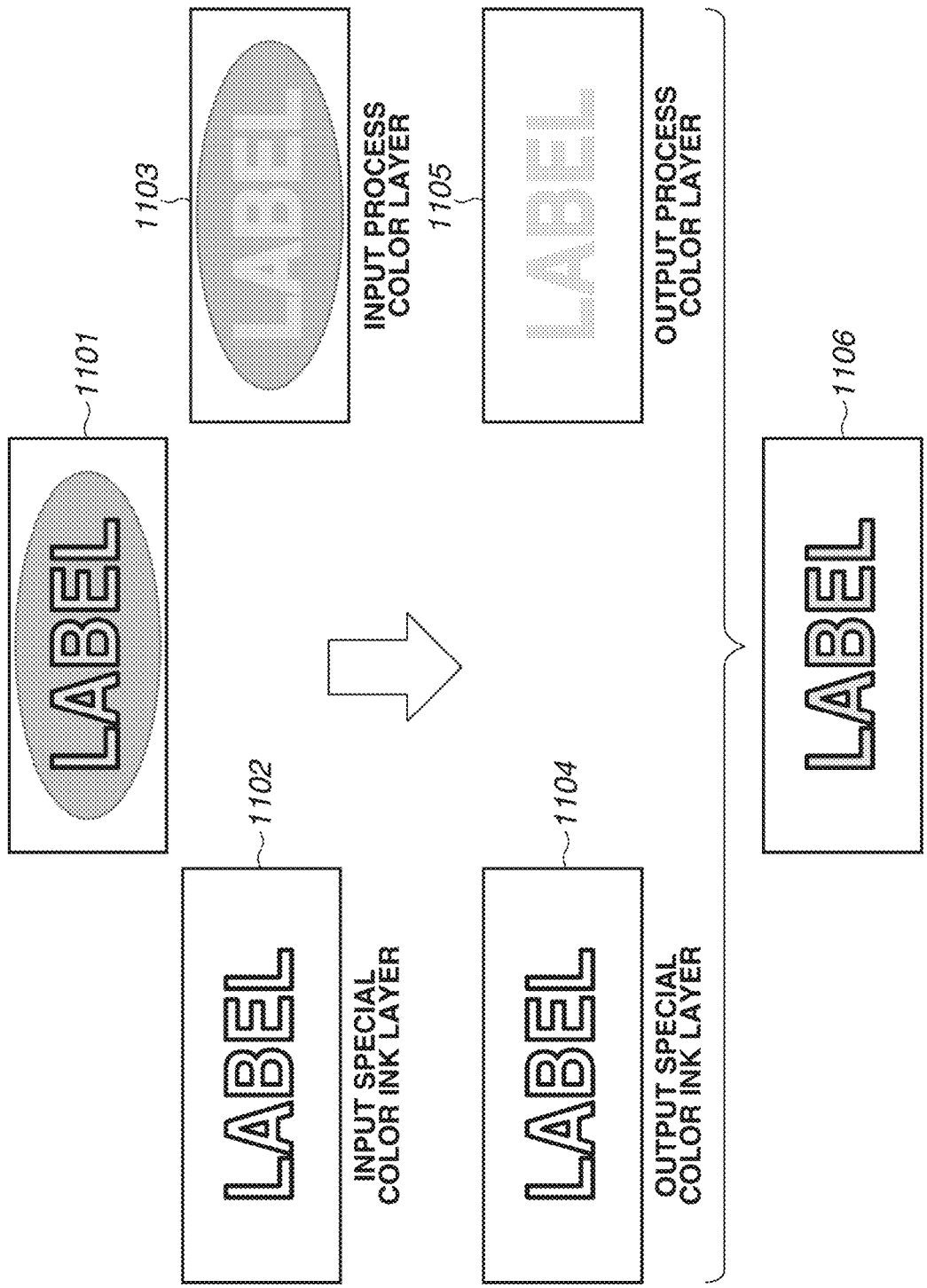

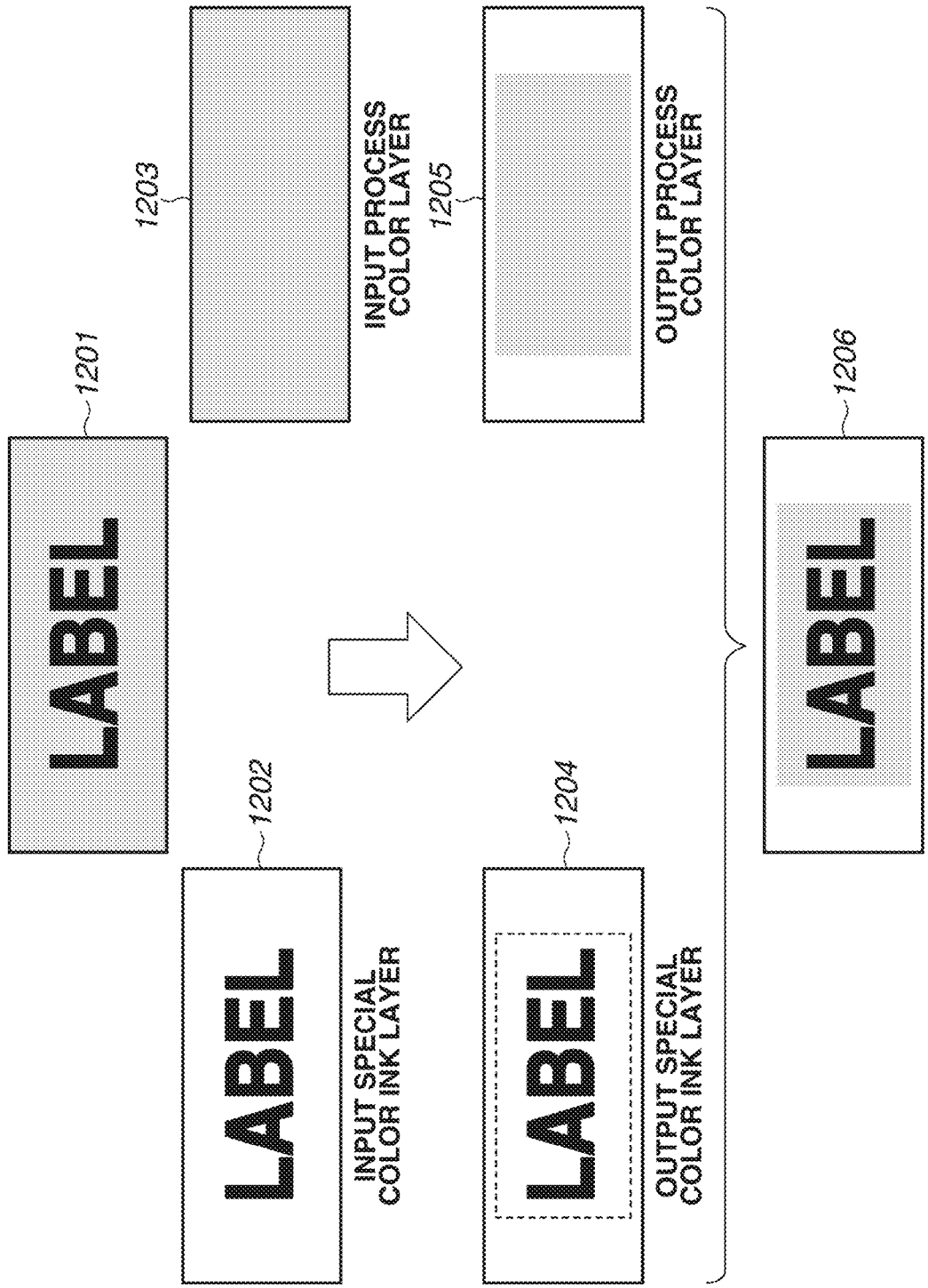

IMAGE FORMING APPARATUS, METHOD, AND COMPUTER PRODUCT FOR TEST PRINTING A SPECIAL COLOR AREA

BACKGROUND

Field

The present disclosure generally relates to image forming and, more particularly, to an image forming apparatus for recording an image on a recording medium, an image forming method, and a storage medium.

Description of the Related Art

In these days, there has been known special color printing using a corporate color or a special color. While the tint of a product is considered to be important in the special color printing, since costs of materials used in the special color printing are high, reduction in amount of ink or the like used for the printing has been demanded. On the other hand, there has been known a preview function that enables checking a print result of the special color or the corporate color on a screen of a monitor without printing an image on a recording medium.

Japanese Patent Application Laid-Open No. 2012-073605 discusses a technique of bringing a display form on a screen closer to an actually printed state because the finished state of the printing changes depending on a state of the background.

Japanese Patent Application Laid-Open No. 2021-002817 discusses a technique of expressing special color data using a process color when a color sample is generated.

SUMMARY

According to some embodiments, an image forming apparatus includes an obtaining unit configured to obtain process color data for forming a process color using a process color ink and special color data for forming a special color, the process color data and the special color data being data to be printed on a printing medium in an overlapped manner, an identification unit configured to identify a special color area in the process color data, the special color area being identified based on a pixel indicating that the pixel forms the special color in the special color data, a generation unit configured to generate data for test printing of the process color ink by not changing an application amount of the process color ink to be applied to the special color area in the process color data and setting the application amount of the process color ink to be applied to an area other than the special color area to substantially zero, and an execution unit configured to execute the test printing of the special color area based on the data for the test printing of the process color ink and the special color data.

Further features of the present disclosure will become apparent from the following description of exemplary embodiments with reference to the attached drawings.

BRIEF DESCRIPTION OF THE DRAWINGS

FIG. 3 is a diagram illustrating a print setting screen of a job list according to a first exemplary embodiment.

FIG. 5 is a diagram illustrating color data for each color included in input data according to the first exemplary embodiment.

FIG. 6 is a diagram illustrating a relationship between input data and a product according to the first exemplary embodiment.

FIG. 11 is a diagram illustrating input and output when a special color area is extracted to perform test printing.

FIG. 12 is a diagram illustrating input and output when a special color area is extracted to perform test printing.

DESCRIPTION OF THE EMBODIMENTS

Various exemplary embodiments, features, and aspects of the disclosure will be described in detail below with reference to the attached drawings.

Figure 1:
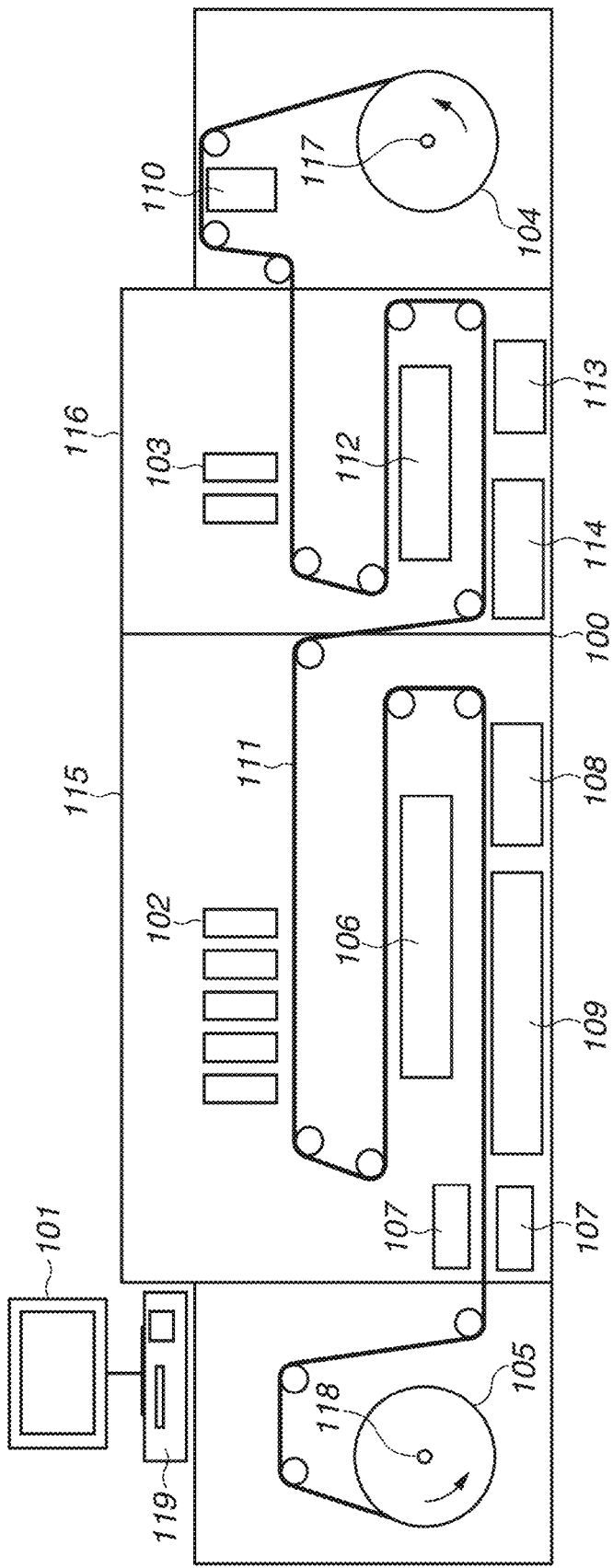
FIG. 1 is a diagram illustrating a configuration of an image forming apparatus.

FIG. 1 illustrates a configuration example of an image forming apparatus according to the present exemplary embodiment. An image forming apparatus 100 forms images on roll paper 111 that is continuous form paper on which the images can be formed continuously. In the present exemplary embodiment, the image forming apparatus 100 includes a sheet feeding device 104 for feeding the roll paper 111, a secondary body 116 for performing special color printing, a primary body 115 for performing basic color printing, a paper discharge device 105 for rolling up the roll paper 111, and a user interface (UI) operation panel 101.

The sheet feeding device 104 feeds the roll paper 111 into the image forming apparatus 100. The sheet feeding device 104 rotates a paper tube of the roll paper 111 around a rotation shaft 117 to convey the roll paper 111, which is wound around the paper tube, toward the image forming apparatus 100 at a constant speed via a plurality of rollers, such as a conveyance roller and a sheet feeding roller.

The paper discharge device 105 is a device to roll up the roll paper 111 conveyed from the image forming apparatus 100 in a rolled manner around the paper tube. As illustrated in FIG. 1, the roll paper 111 is wound around the paper tube of a rotation shaft 118 and held in a rolled form. The paper discharge device 105 is rotated around the rotation shaft 118 to roll up the roll paper 111, which has been conveyed to the paper tube, around the rotation shaft 118 at a constant speed via, for example, a plurality of rollers, such as a conveyance roller and a discharge roller, as a product of the roll paper 111.

Before starting printing, the roll paper 111 is passed through the apparatus from the sheet feeding device 104 to the paper discharge device 105 to be set on the sheet feeding device 104. The leading edge of the roll paper 111 is passed over a skew correction device 110. Next, the leading edge of the roll paper 111 is passed under a printing device 103, over a drying device 112, and over cooling devices 113 and 114, which are disposed in the secondary body 116. Next, after the roll paper 111 is passed under a printing device 102, over a drying device 106, over cooling devices 108 and 109, and between continuous scanner devices 107, which are disposed in the primary body 115, the roll paper 111 is wound around the paper discharge device 105. After the roll paper 111 is passed through the image forming apparatus 100, a print job is transmitted to a control personal computer (PC) 119 for controlling the image forming apparatus 100. After the print job is transmitted to the control PC 119, printing starts when a print start button on the UI operation panel 101 is pressed.

The printing devices 102 and 103 each include a plurality of recording heads. Each of the recording heads includes a plurality of nozzles each provided with a discharge element for discharging ink. Examples of the discharge element include an element for discharging ink in the nozzle as droplets by generating pressure in the nozzle, and a known ink-jet head element can be applied thereto. The ink discharge element according to the present exemplary embodiment is an element for discharging ink by causing film boiling of ink using an electro-thermal converter to generate air bubbles. In addition, an element discharging ink using an electro-mechanical transducer, or an element discharging ink using static electricity may be used. The electro-thermal converter is desirably used for the ink discharge element from a viewpoint of high speed and high density recording.

In the present exemplary embodiment, the printing device 103 includes three recording heads, and the printing device 102 includes eight recording heads. In the present exemplary embodiment, the recording heads discharge different types of inks. The different types of inks refer to, for example, different types of color material inks, such as a yellow (Y) ink, a magenta (M) ink, a cyan (C) ink, and a black (K) ink. The inks in the present exemplary embodiment are not limited to color inks of process colors including yellow, magenta, cyan, and black color materials, and can include a special color ink for gamut expansion or functionality addition, a white ink used for background or the like, and other types of ink. In addition, the configuration is not limited to a configuration in which one type of ink is discharged from one recording head, and a plurality of types of inks may be discharged from one recording head.

Further, a recording head for discharging inks not including color materials, such as a clear ink or a reaction liquid, may be provided.

Further, the printing devices 102 and 103 can operate in part as an obtaining unit configured to obtain process color data for forming a process color using a process color ink and special color data for forming a special color, the process color data and the special color data being data that can be printed on a printing medium in an overlapped manner.

Figure 2:
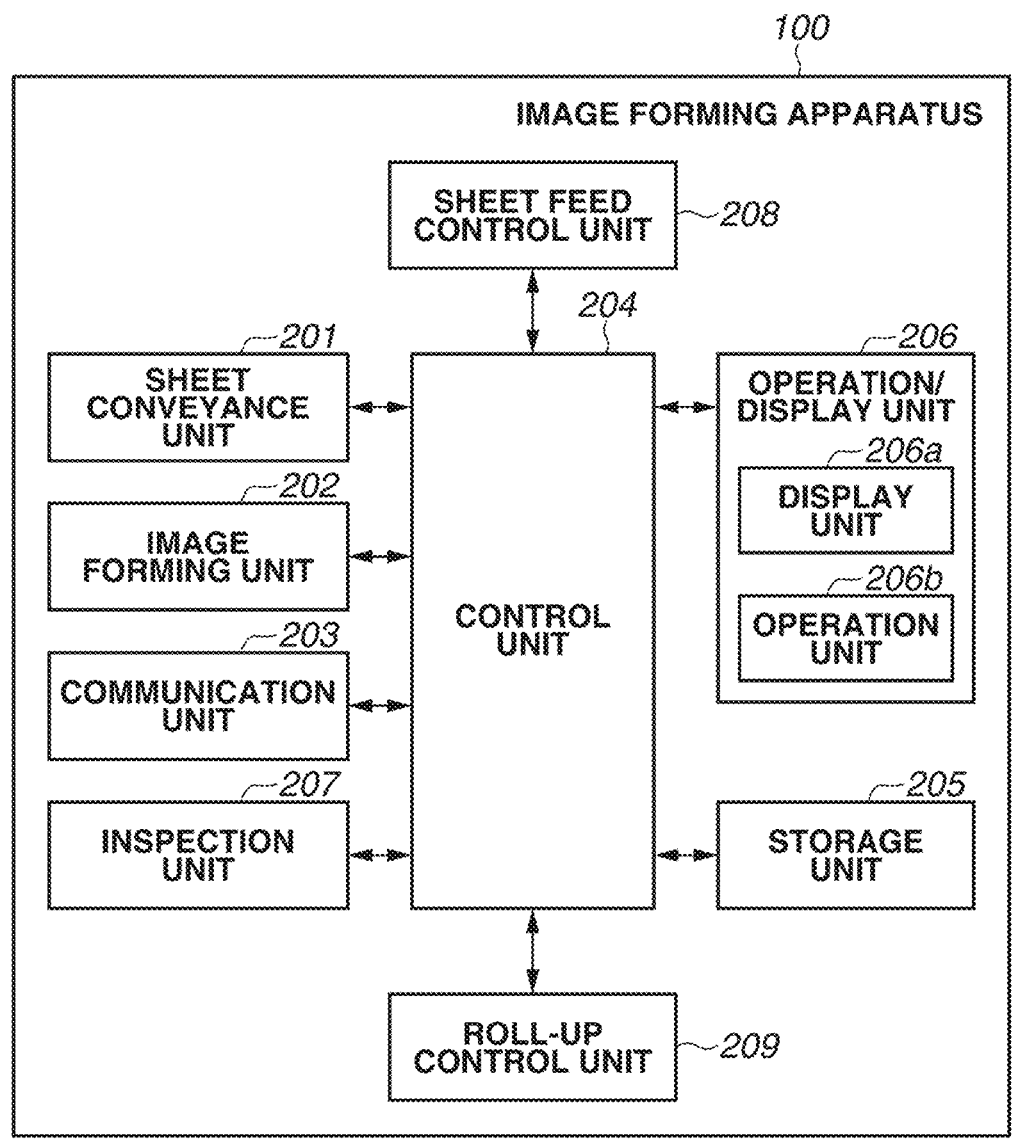
FIG. 2 is a block diagram illustrating a functional configuration of the image forming apparatus.

FIG. 2 is a functional block diagram illustrating a control configuration of the image forming apparatus 100. As illustrated in FIG. 2, the image forming apparatus 100 includes a sheet conveyance unit 201, an image forming unit 202, a communication unit 203, a control unit 204, a storage unit 205, an operation/display unit 206, an inspection unit 207, a sheet feed control unit 208, and a roll-up control unit 209. The sheet conveyance unit 201 is a conveyance mechanism for the roll paper 111 in the image forming apparatus 100. For example, the roll paper 111 that has been conveyed from the sheet feed control unit 208 is conveyed to the image forming unit 202 by a plurality of rollers, and the roll paper 111 that has passed the image forming unit 202 is conveyed to the roll-up control unit 209. The image forming unit 202 forms an image on the roll paper 111 supplied from the sheet feed control unit 208, based on print data output of which has been instructed. The roll paper 111 with an image formed thereon is conveyed toward the roll-up control unit 209. The communication unit 203 is configured of a communication control card, such as a local area network (LAN) card. Various kinds of data are transmitted and received between the communication unit 203 and an external apparatus, such as a PC, connected to a communication network, such as a LAN or a wide area network (WAN).

The control unit 204 is configured of, for example, a central processing unit (CPU) and a random access memory (RAM). The CPU of the control unit 204 can include one or more processors, circuitry, or combinations thereof and executes various kinds of processing by reading various kinds of programs, such as a system program and a processing program, stored in the storage unit 205 and loading the programs into the RAM, based on the loaded programs. For example, the control unit 204 can perform image forming processing to execute an image forming job (hereinbelow, referred to as a job) in response to a user's instruction. For example, the storage unit 205 is configured of a non-volatile semiconductor memory, such as what is called a flash memory, and a hard disk drive (HDD). The storage unit 205 stores the various kinds of programs, such as the system program and the processing program, to be executed by the control unit 204 and various kinds of data used to execute these programs.

The operation/display unit 206 is configured of a liquid crystal display (LCD) with a touch panel, and the like, and is provided with a display unit 206a and an operation unit 206b. The display unit 206a displays various kinds of information on a display screen based on a display control signal input from the control unit 204. The operation unit 206b includes various kinds of operation keys, such as numeric keypads and a start key, and receives various kinds of input operations from a user to output operation signals to the control unit 204. The operation/display unit 206 is used in a case where the user sets job information when the user executes the job, and the user can freely set conditions, such as a sheet type, print speed information, the number of sheets to be printed, the number of copies to be printed, a length of a printed image, a weight of a printed image, and a diameter of a printed image.

Next, operation of the image forming apparatus 100 to form an image on the roll paper 111 will be described. First, when the user creates job data and makes print settings and settings of the number of rolls to be delivered of the job in an external apparatus, these pieces of information are transmitted to the image forming apparatus 100 via a communication network. The control unit 204 of the image forming apparatus 100 receives the job data transmitted from the external apparatus via the communication unit 203, and a job ticket including information about the print settings of the job and information about the number of rolls to be delivered.

The inspection unit 207 inspects whether the printed image is printed on the roll paper 111 without defect. An ink discharge failure inspection pattern is printed and read by the continuous scanner devices 107 to check whether an ink discharge failure has occurred. In a case where an ink discharge failure is detected, the image forming apparatus 100 is stopped. Examples of inspection methods include an inspection method of reading a printed image directly with a camera or a scanner, and an inspection method of monitoring a discharge state from nozzles, in addition to the inspection method of printing an inspection pattern and reading the printed inspection pattern with a scanner. In the present exemplary embodiment, whether defective discharge has occurred is determined using the method of printing an inspection pattern and reading the printed inspection pattern with a scanner.

The image forming apparatus 100 according to the present exemplary embodiment has a tandem structure including a plurality of printing devices, i.e., the printing devices 102 and 103. The printing device 103 performs background printing using white ink, and the printing device 102 performs color printing. The printing device 102 can perform printing using not only color inks but also functional inks, such as a foaming ink and an ink including metal particles.

In addition, the image forming apparatus 100 can perform printing that looks like a special color using a process color by giving a texture pattern by the image processing in the image forming unit 202 of the image forming apparatus 100. In the present exemplary embodiment, a configuration including a gold-silver color print function to perform printing that looks like a gold leaf mainly using a process color is described, but a configuration for giving a wide range of textures, such as a wood-grain texture and a metallic texture, can be performed.

Next, image forming processing by the image forming apparatus 100 to perform normal printing and test printing will be described. First, the user creates job data on an external apparatus and performs print processing settings of the job, and then the data and the settings are transmitted to the image forming apparatus 100 via a communication network. The image forming apparatus 100 can receive both a job including special color information and a job not including the special color information. In the present exemplary embodiment, the job is assumed to be the job including the special color information.

The job including the special color information may include one document or a plurality of documents. A special color designation in one document is generated in a form including a special color ink layer indicating a special color area in which a special color is to be applied, in addition to a layer corresponding to ink data of a process color ink, such as cyan, magenta, yellow, and black (CMYK), using a layer structure. Further, in the special color designation in a plurality of documents, one or a plurality of documents including only special colors is transmitted together with a document or documents with the process color ink or inks designated, and the plurality of documents is associated and recognized in the image forming apparatus 100. The association method may be a method of providing a notification of corresponding document names using a command or a job ticket, or a method of determining the association automatically by the image forming apparatus 100 based on a naming rule of the documents.

The control unit 204 of the image forming apparatus 100 receives and registers the job data and the print settings transmitted from the external apparatus via the communication unit 203. FIG. 3 illustrates a list screen (hereinbelow, referred to as a job list) on which received jobs are displayed. On the job list, transmitted document names, the numbers of pages, the numbers of copies, and paper types are displayed. Further, the user can select a job displayed on the job list, such as a displayed item (job) 301, by operating an operation key of the operation unit 206b.

A displayed item (print setting button) 302 is a button to perform test printing settings and can be set for the selected job 301. A displayed item (print start button) 303 is a button to start image formation of the job 301 selected from among the jobs displayed on the job list.

Figure 4A:
FIGS. 4A and 4B are diagrams illustrating test printing setting screens according to the first exemplary embodiment.
Figure 4B:

FIGS. 4A and 4B are diagrams illustrating an example of setting screens to perform settings of a test printing provided by the control unit 204 and the display unit 206a when the print setting button 302 in FIG. 3 is pressed. FIG. 4A is an example of a screen to set colors when the test printing is performed. In this screen, the name of the job 301 selected when the print setting button 302 is pressed and the screen enters a menu for the test printing is displayed at an upper portion of the screen. The field can take any form as long as the user can be recognized, such as an identifier (ID), and is not limited to the name. Further, print parameters, such as a paper type, usable not only for the normal printing but also for the test printing may be displayed.

A display portion 401 is used to select a mode when a test printing is performed. With a selection portion 402, the user can select one of two patterns of performing an all color printing mode and of performing only the special color area printing mode that is a feature of the present disclosure. A display portion 403 is a menu that becomes settable when the selection portion 402 is selected. In a case where the all color printing mode is selected in the selection portion 402, the display portion 403 may be configured to be inoperable by a user, for example, by being not displayed or grayed out.

In the display portion 403, color information about the special color included in the selected job 301 is displayed as illustrated in special color information portions 404. The special color information displayed in the special color information portions 404 indicates information identified for the received job by the image forming apparatus 100 based on the print settings or the layers of the document. Next to the special color information portions 404, selection portions 405 (check boxes) are arranged. When one of the selection portions 405 is selected, a special color to be a test printing target is selected. A display portion 406 is a button to select all special color areas, and the user can automatically select all the selection portions 405. A display portion 407 is a button to display a display portion to preview a test printing area, and a display portion 408 is a button to start the test printing. An image formation may be directly started by pressing the button of the display portion 408, or by generating a new job for the test printing in the job list in FIG. 3 and then starting the image formation by pressing the print start button 303 on the job list.

FIG. 4B is an example of a preview screen in the test printing, provided by the control unit 204 and the display unit 206a when the display portion 407 is pressed on the print setting screen in FIG. 4A. The preview screen includes a display area 409, and in the display area 409, a preview of original data 410 and an area 411 obtained by extracting only an area including a special color selected in one of the selection portions 405 in FIG. 4A are displayed.

Further, the preview screen in FIG. 4B includes selection portions 412 having the same functions as the selection portions 405 in FIG. 4A, and can change a special color to be the test printing target without transition of the screens. In addition, the preview screen in FIG. 4B includes a test printing start button 413 having the same function as the button of the display portion 408 in FIG. 4A.

FIG. 5 is a diagram illustrating generation processing of data for the image formation in the test printing, and is an example of a job received by the image forming apparatus 100. An entire job image 500 includes image data configured of a plurality of layers. The job includes a bar-code area 501 formed of process colors of CMYK, a braille area 502 formed of process colors and a foaming ink, and an area 503 formed by gold color printing performed by adding a texture to a process color. In FIG. 5, a process color layer 506 for one process color is illustrated, but actually layers corresponding to the number of ink colors, i.e., four colors of CMYK, are included.

The job includes the process color layer 506, which is multi-valued data of the process color, a white layer 507, which is multi-valued data of white ink formed as a background, and special color ink layers 504 and 505, which are multi-valued data each for forming a special color area. The special color ink layer 504 is data indicating whether to perform the gold color printing as the special color printing, and the special color ink layer 505 is data indicating whether to perform foaming ink printing as the special color printing.

As described above, the "special color" is not limited to a color recorded using an ink prepared for a specific color, such as a foaming ink. The special color may be a layer indicating data indicating a specific color designated by a user referred to as what is called a corporate color or a spot color, or may be a specific color generated using only process color inks. In many cases, data indicating on/off of one specific color is a special color ink layer, but on/off of a plurality of specific colors can also be expressed by one layer. Further, the special color ink layer may be a texture layer indicating whether to give a texture to each pixel when the texture pattern is formed.

FIG. 6 is a diagram illustrating input and output when special color areas are extracted to perform the test printing. FIG. 6 illustrates a relationship between input data and a product with an image formed thereon. Unlike the input layers illustrated in FIG. 5, the processing is performed using the test printing settings of all the special color ink layers.

First, entire areas of input special color ink layers 601 and 602 are print targets. Accordingly, output special color ink layers 605 and 606 are the same layers as the input special color ink layers 601 and 602. Next, an input process color layer 603 and an input background layer 604 are respectively output as an output process color layer 607 and an output background layer 608 obtained by extracting only areas to be printed as the special color areas of the output special color ink layers 605 and 606. An image is formed based on the output layers 605 to 608, and a product 609 is generated.

In the present exemplary embodiment, as described above, a process color ink and a background ink are given to the areas designated as the special color areas in the output special color ink layers 605 and 606. In this way, in the test printing, in the areas designated by the user as the special color areas, the same colors as the colors in the special color printing (decorative printing) printed in the normal printing are expressed. If only the output special color ink layers 605 and 606 are printed, the same colors as the special colors in the normal printing are not expressed in a case where the special colors are expressed by giving the process color and the background ink in an overlapped manner with the special color inks. Further, even in a case where the special colors are expressed only by the process colors, the same colors as the special colors in the normal printing are not expressed in a case where data of the special color areas is included in the input process color layer 603. Accordingly, in the present exemplary embodiment, for each of the input process color layer 603 and the input background layer 604, the areas corresponding to the special color areas of the input special color ink layers 601 and 602 are extracted. Then, the output process color layer 607 and the output background layer 608 are generated so as to apply the process color ink and the background ink to the respective extracted areas, and not to give the process color ink and the background ink to the other area. As a result, the application amounts of the process color ink and the background ink applied to an area other than the special color areas in the output process color layer 607 and the output background layer 608 become substantially zero.

Figure 7:
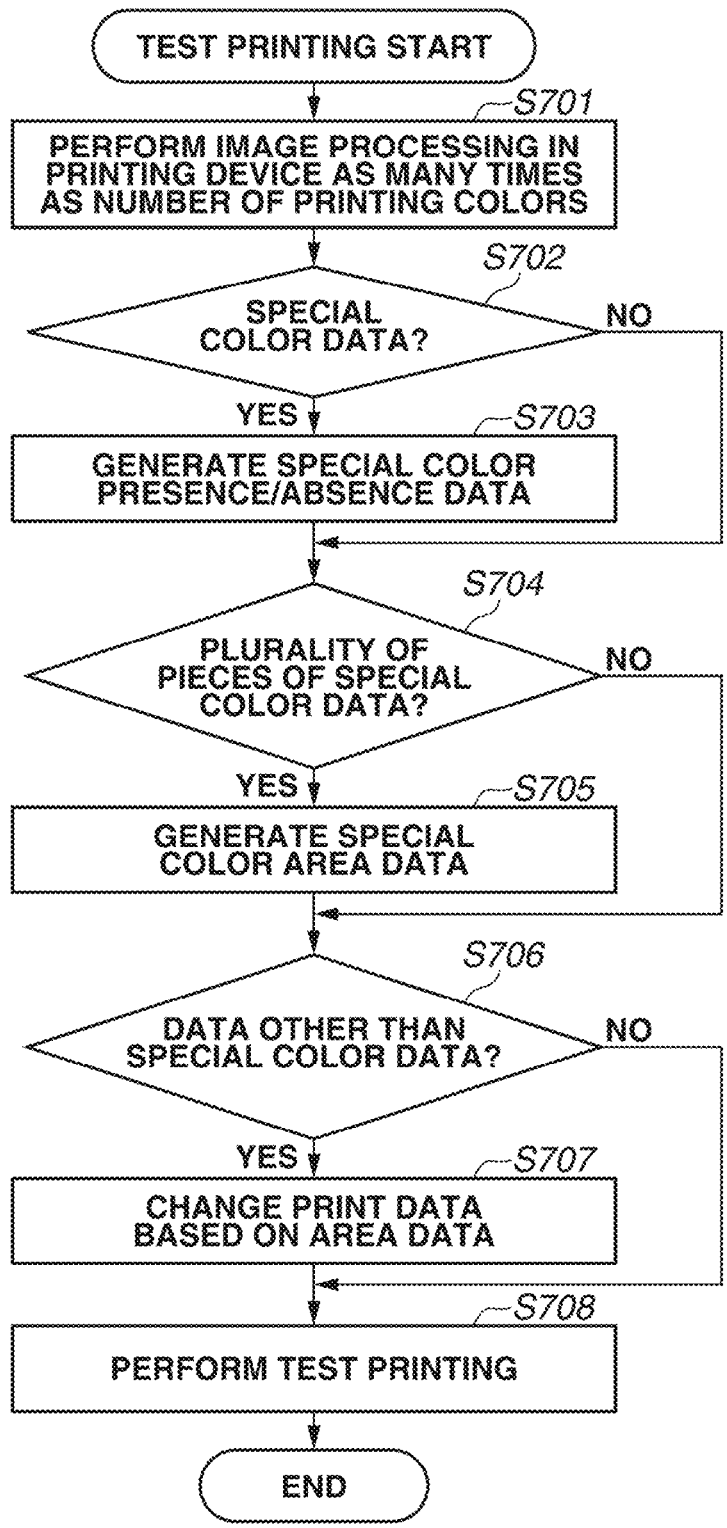
FIG. 7 is a flowchart illustrating a processing procedure of test printing according to the first exemplary embodiment.

In the processing steps of FIG. 7, the control unit 204 can operate in part as a generation unit configured to generate data for test printing of the process color ink by not changing an application amount of the process color ink to be applied to the special color area in the process color data and setting the application amount of the process color ink to be applied to an area other than the special color area to substantially zero.

Figure 8:
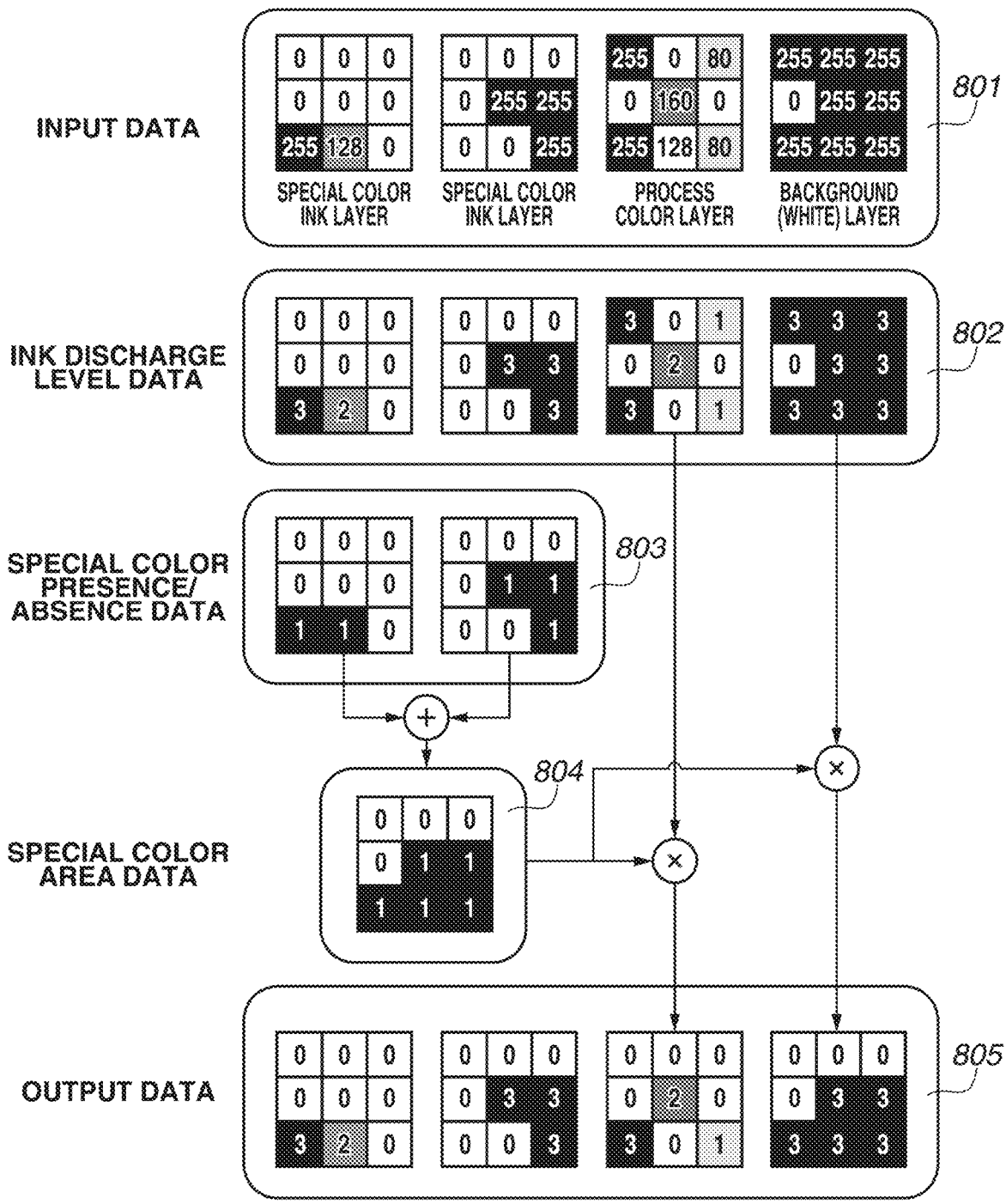
FIG. 8 is a diagram illustrating data in each process of the test printing according to the first exemplary embodiment.

FIG. 7 is a flowchart illustrating test printing processing, and FIG. 8 is a diagram illustrating data generated in each procedure of the test printing processing. When the control unit 204 receives a test printing instruction via the display unit 206a, then in step S701, similar to the normal printing, the control unit 204 performs image processing on data of all printing color layers. Input data 801 in FIG. 8 is color density data of 0 to 255 for each color. Depending on an input color, the input data 801 may be an input with binary data of 0 and 1 indicating whether to form a dot. In a case where the image data is to be converted into that of 256 gradations of 0 to 255, 0 and 1 can be replaced with 0 and 255, respectively. In the image processing in step S701, based on the data expressed in terms of the density of each color, ink discharge level data 802 indicating ink amount levels actually discharged from the printing device 102 of the image forming apparatus 100 is generated. Based on the ink discharge level data 802, inks are discharged from the recording heads to form an image. In the ink discharge level data 802, an ink discharge level of 1 or larger indicates discharging ink, and an ink discharge amount at that time is indicated with a numerical value. The ink discharge level of 0 indicates discharging no ink. The ink discharge level data 802 in FIG. 8 is four-valued data of 0 to 3, but the number of levels is not limited thereto.

In step S702, the control unit 204 determines whether each pixel of the generated ink discharge level data 802 is a pixel in the special color area. In a case where the pixel is a pixel in the special color area (YES in step S702), the processing proceeds to step S703. In step S703, a value of the corresponding pixel in special color presence/absence data 803 is changed to "1". In a case where the pixel is not a pixel in the special color area (NO is step S702), a value in the corresponding pixel in the special color presence/absence data 803 remains "0", and the processing proceeds to step S704. In the example in FIG. 8, the special color presence/absence data 803 is generated for each of two special color ink layers indicating two kinds of special color areas.

After generating the special color presence/absence data 803 for all the pieces of special color data, in step S704, the control unit 204 determines whether a plurality of input target special color ink layers is present. In a case where the plurality of input target special color ink layers is present (YES in step S704), the processing proceeds to step S705. In step S705, the control unit 204 generates special color area data 804 based on all the pieces of special color presence/absence data 803. The special color area data 804 is binary data indicating whether an area is the special color area in at least one special color ink layer of the plurality of special color ink layers. More specifically, in a case where a target pixel has data indicating a special color area in at least one pixel of corresponding pixels in the plurality of pieces of the special color presence/absence data 803, the target pixel is set to "1", and otherwise, the target pixel is set to "0".

In step S706, the control unit 204 determines whether the data is data other than the special color data. In a case where the control unit 204 determines that the data is data other than the special color data (YES in step S706), the control unit 204 obtains data other than the special color data, i.e., the ink discharge level data 802 of the process color ink and the ink discharge level data 802 of the background ink, and the processing proceeds to step S707. In step S707, the control unit 204 generates output data 805. In the output data 805, two pieces of the data indicating the special color areas are the same as those in the ink discharge level data 802. As for the process color ink and the background ink, the values of the pixels corresponding to the pixels in the special color areas are maintained to be the same values as those in the ink discharge level data 802 in each of the pieces of the ink discharge level data 802. On the other hand, the values of the pixels corresponding to the pixels not in the special color areas are changed to "0". In other words, from values in the ink discharge level data 802 of the process color ink and the ink discharge level data 802 of the background ink, the values of the pixels corresponding to the pixels with a pixel value of "1" in the special color area data 804 are maintained. On the other hand, the values of the pixels corresponding to the pixels with a pixel value of "0" in the special color area data 804 are discarded and updated to "0". As a result, the data of the process color ink and the background ink corresponding to the special color areas is extracted by maintaining the data of the process color ink and the background ink for only the pixels in the special color areas. In this case, in a case where the process color ink or the background ink is to be supplied a bit more, the special color area data 804 may be expanded and used. As for the special color data, the values of the ink discharge level data 802 are directly set as the output data 805. Then, in step S708, an image is formed based on the output data 805.

In the processing of FIGS. 7 and 8, the control unit 204 can operate in part as an identification unit configured to identify a special color area in the process color data, the special color area being identified based on a pixel indicating that the pixel forms the special color in the special color data. The control unit 204 can also be considered to operate as an execution unit configured to execute the test printing of the special color area based on the data for the test printing of the process color ink and the special color data.

In addition, while the processing when the test printing is performed has been described above with reference to FIGS. 5 to 8, data for performing the normal printing can also be generated. In the normal printing, output data indicating whether to discharge inks for all the layers included in the received image data may be generated, and based on the generated output data, image forming may be performed.

As described above, in the test printing according to the present exemplary embodiment, the special color areas are extracted when the job including the special color data and the data indicating applying an ink other than the special color inks is received. For the extracted special color areas, the data values to discharge all the inks are maintained to form the image with the same colors as those printed in the normal printing. On the other hand, for the area other than the special color areas, the pixel values are changed to "0" so as not to apply the process color ink or the background ink, and the area becomes an area with no ink applied thereto. As a result, the special color areas are printed in the similar way to the normal printing, no ink is applied to the area other than the special color areas, and the image obtained by extracting only the special color areas can be formed. As a result, in the test printing for the special colors, it is possible to check the same colors as those in the normal printing in the special color areas, while reducing ink consumption amounts.

In addition, in the present exemplary embodiment, the example in which two kinds of the special color data are used is described, but a configuration in which more than one kind of the special color data is used may be employed. In a case where only one kind of the special color data is used, the special color presence/absence data 803 can be directly used as the special color area data 804.

Further, in the present exemplary embodiment, the white ink is used as the background ink, but the background ink is not necessarily required. Further, an ink other than the white ink can be used as the background ink.

Next, a second exemplary embodiment will be described. The present exemplary embodiment includes a mode of forming an image without changing the image size when an image is formed only in special color areas, and a mode of shortening the distance between the special color areas when there is an area with no ink applied thereto between a plurality of special color areas. The configuration of the image forming apparatus 100 according to the present exemplary embodiment is similar to that according to the first exemplary embodiment.

Figure 9:
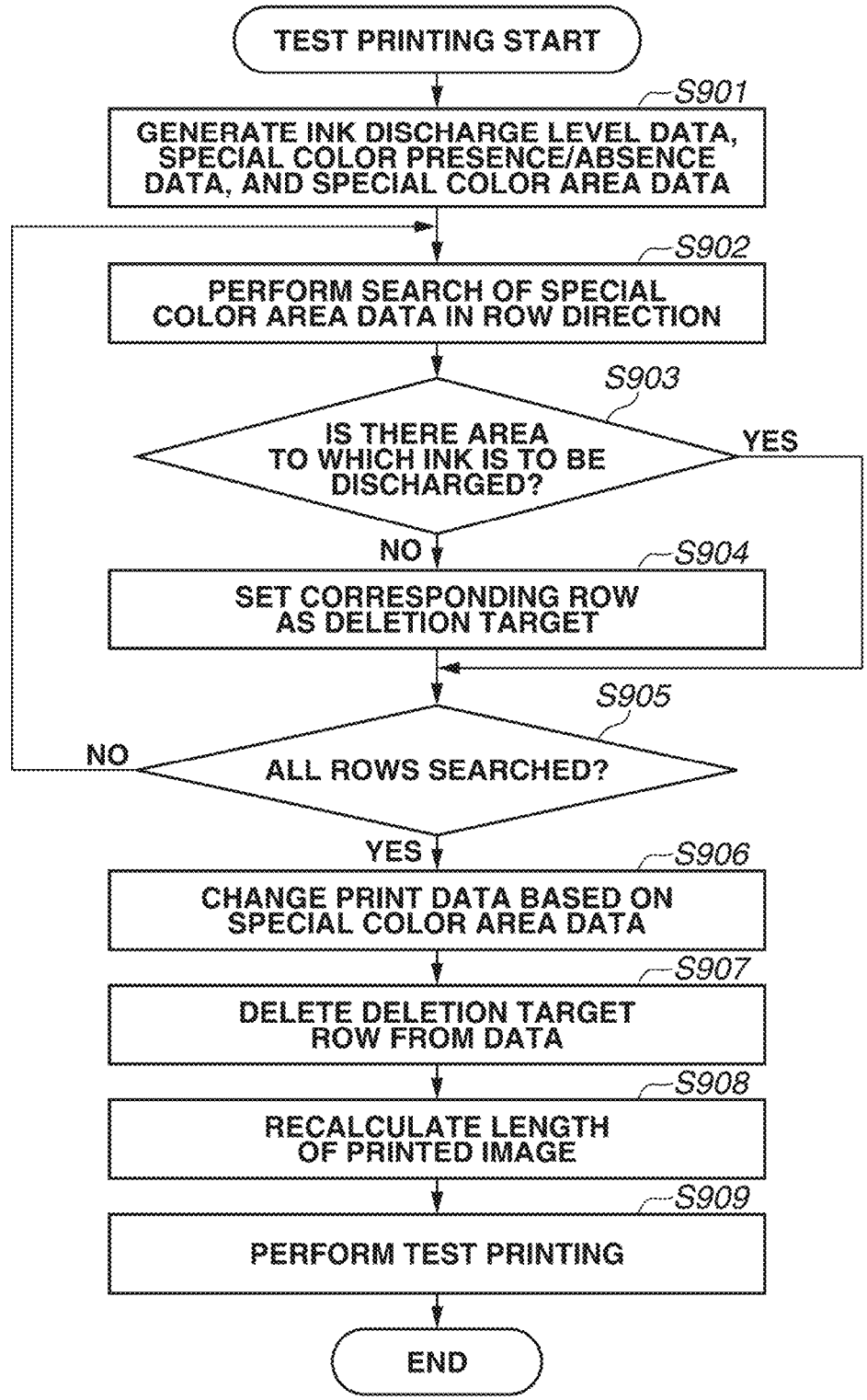
FIG. 9 is a flowchart illustrating a processing procedure of test printing according to a second exemplary embodiment.
Figure 10:
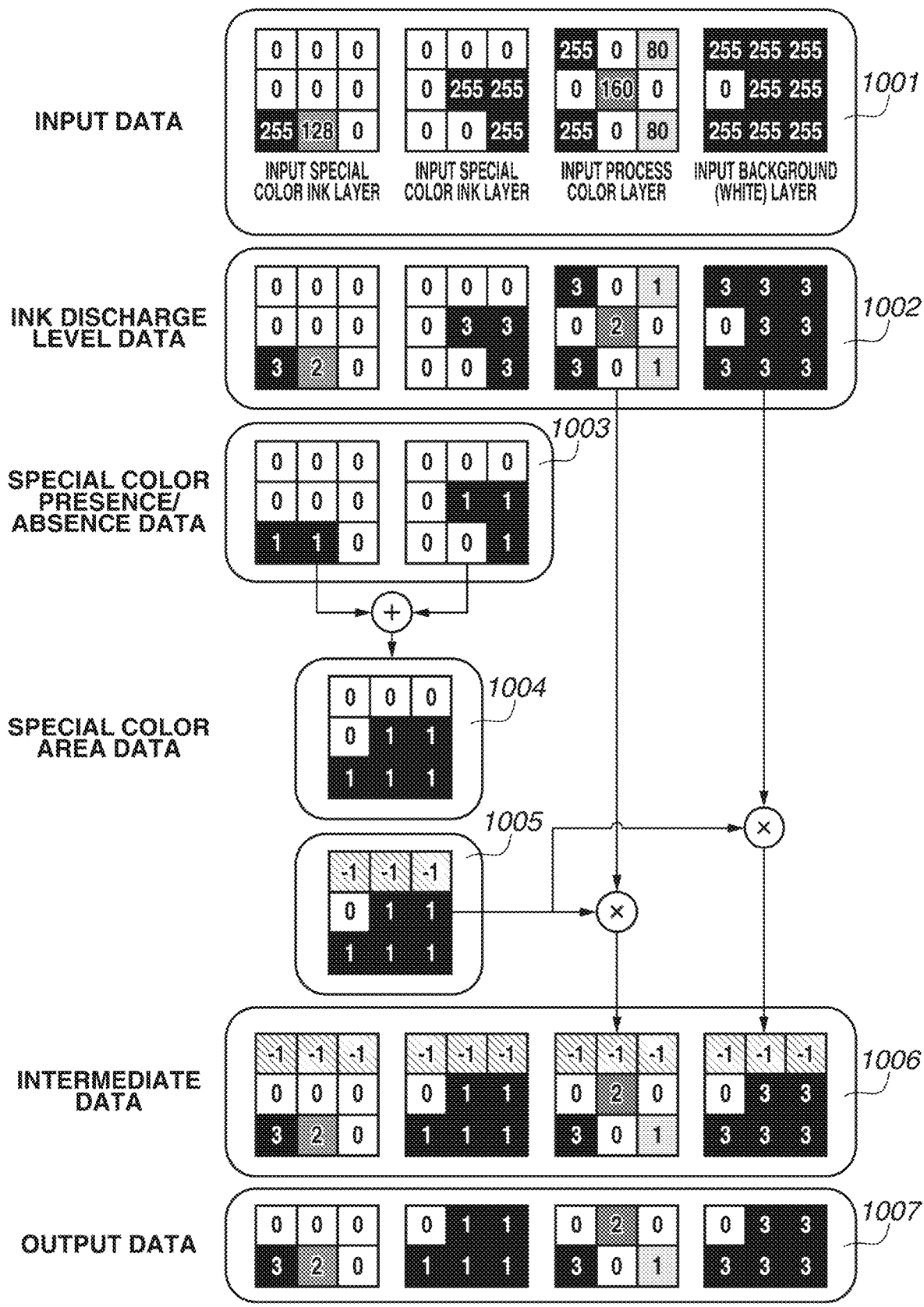
FIG. 10 is a diagram illustrating data in each process of the test printing according to the second exemplary embodiment.

FIG. 9 is a flowchart illustrating an operation procedure of the image forming apparatus 100 according to the present exemplary embodiment. FIG. 10 is a diagram illustrating transition from input image data to data during image processing, and to output data.

First, in step S901, through the similar procedures in steps S701 to S705 in FIG. 7, the control unit 204 generates ink discharge level data 1002, special color presence/absence data 1003, and special color area data 1004, from input data 1001.

Next, in step S902, the control unit 204 performs a search of the special color area data 1004 in a row direction, i.e., a sheet width direction (horizontal direction in FIG. 10). In step S903, the control unit 204 determines whether there is an area to which ink is to be discharged. In step S903, in a case where all values in a row are "0", no ink is discharged (NO in step S903), and the processing proceeds to step S904. In step S904, the control unit 204 changes the pixel values in the row from "0" to "−1". As a result, the values of special color area data 1005 may be three values of "0", "1", and "−1". In step S905, the control unit 204 determines whether all the rows are searched. In a case where it is determined that not all the rows are searched (NO in step S905), the processing returns to step S902 to search the next row. The control unit 204 continues the search until the control unit 204 completes searching all the rows. In a case where all the rows are searched (YES in step S905), the processing proceeds to step S906. In this way, the special color area data 1005 is generated.

Next, in step S906, the control unit 204 performs combination processing to combine the special color area data 1005 and the ink discharge level data 1002 for each ink other than special color inks. This case is different from the processing performed in step S707 of the above-described first exemplary embodiment in that, in a case where the values of the special color area data 1005 are "−1", the control unit 204 sets the ink discharge level data also to "−1". As a result thereof, intermediate data 1006 is generated. In step S907, the control unit 204 deletes a range with the ink discharge level of "−1" in the intermediate data 1006 from the image data to generate output data 1007. In addition, since a plurality of pieces of data is connected due to areas of "−1" being deleted in the special color area data 1005, the special color area data 1005 may be expanded to reduce the areas of "−1", and used.

Since the data is deleted in the row direction in step S907, the size of the output data 1007 for image formation becomes smaller than that in the print settings. Thus, in step S908, the control unit 204 recalculates the length of the image to be printed based on the deleted amounts. Then, in step S909, the control unit 204 performs the test printing based on the recalculated length and the output data 1007.

In this way, the present exemplary embodiment includes the configuration for detecting and deleting the areas with no ink applied thereto to reduce the length of the image in the test printing when the special color areas are extracted, in addition to the configuration of the first exemplary embodiment. In this way, it is possible to check the colors of the special color areas while reducing the amount of a recording medium used for the test printing performed to check the tint of the special color.

When the test printing for only the special color areas is performed, it is important for some sheet types, such as a film, to perform the test printing including the process color and the white ink because the tint cannot be correctly checked without the white ink serving as the background. From a viewpoint of the importance of the background, it is also effective to check the special color using the corporate color. With regard to the corporate color, since the tint of a corporate logo or the like is important, it is important to perform the tint check including the background.

In the exemplary embodiments described above, the description is given of the example of printing all of the plurality of the special color ink layers in the test printing, but all of the special color ink layers are not necessarily printed, and any of the special color ink layers may be selectively printed. In this case, the control unit 204 may generate special color presence/absence data for the special color ink layers to be printed, and may generate output data of the process color ink to apply the corresponding process color ink to each of the pixels. Further, in a case of texture printing using a process color, such as a gold color printing, no special color ink is used, but it is possible to perform the decorative printing by treating the area designated by the texture layer as the special color area.

In the exemplary embodiments described above, the description is given of the example of the gold color printing using the foaming ink as the functional ink and the process color as the texture printing, but the configuration described above can be applied to a metallic color printing. In the metallic color printing, a color image with metallic feeling is formed by applying a metallic ink including metal particles of, for example, silver and process color inks in an overlapped manner. In such a case, the tint check becomes less effective if the test printing uses only a silver color ink. Thus, similar to the above-described configuration, the tint can be checked by performing the test printing only for a metallic color area, by extracting an area to which the metallic ink is to be applied and maintaining the applied amount of the process color ink to the area to which the metallic ink is to be applied. At this time, a metallic layer including both a metallic area formed only of the metallic ink and a color metallic area formed using both the metallic ink and the process color ink may be obtained. Alternatively, a layer of the metallic area formed only of the metallic ink and a layer of the color metallic area formed using both the metallic ink and the process color ink may be individually obtained. In the first exemplary embodiment, the description is given of the example of performing the gold color printing using the process color, but it is also possible to perform the gold color printing using the metallic ink and a yellow ink.

Further, in the test printing in the above-described exemplary embodiments, the application amounts of all the inks to be applied to the area other than the special color areas are set to "0". It is preferable to set the application amounts of inks to the area other than the special color areas to substantially "0" in a case where a purpose is to check the tint of the special color areas, but it is not necessarily required to set the application amounts to "0", and a small amount of ink may be applied. The effect of reducing the ink amounts used in the test printing can be obtained by setting the amounts of the process color ink and/or the background ink to be less than those applied in the normal printing.

Further, another exemplary embodiment of the first exemplary embodiment described above with reference to FIG. 6 will be described. FIG. 11 is a diagram illustrating input and output when a special color area is extracted to perform the test printing. FIG. 11 illustrates a relationship between input data and a product with an image formed thereon. An entire job image 1101 includes image data configured of a plurality of layers.

An entire area of an input special color ink layer 1102 is a print target. Accordingly, an output special color ink layer 1104 is the same layer as the input special color ink layer 1102. Next, in an input process color layer 1103, an area to be printed as the special color area of the output special color ink layer 1104 is specified, and is output as an output process color layer 1105 extracted therefrom. An image is formed based on the output layers 1104 and 1105, and a product 1106 is generated. As an extraction method of the output process color layer 1105, an object present in the output special color ink layer 1104 is identified, and a process color area in a special color object is extracted by performing a logical operation with the output process color layer 1105.

In this way, the process color ink is applied to the area designated as the special color area in the output special color ink layer 1104. With this operation, it is possible to check the tint of the special color areas in a similar manner to the normal printing while reducing the ink consumption amounts even in a case where the product is formed using the process color in the object of the special color area.

Further, yet another exemplary embodiment will be described. FIG. 12 is a diagram illustrating input and output when a special color area is extracted to perform the test printing. FIG. 12 illustrates a relationship between input data and a product with an image formed thereon. An entire job image 1201 includes image data configured of a plurality of layers.

An entire area of an input special color ink layer 1202 is a print target. Accordingly, an output special color ink layer 1204 is the same layer as the input special color ink layer 1202. Next, in an input process color layer 1203, an area to be printed as the special color area of the output special color ink layer 1204 is identified. In the present exemplary embodiment, as an extraction method of an output process color layer 1205, a rectangular area is specified to include an object to which the special color ink is applied in the output special color ink layer 1204. Then, the rectangular area is overlaid on the input process color layer 1203 to extract a process color area in a special color object. The area surrounded by dotted lines in the output special color ink layer 1204 indicates the rectangular area including the object to which the special color ink is to be applied. Then, the output process color layer 1205 is generated so that the process color ink is applied to the rectangular area, and output. An image is formed based on the output layers 1204 and 1205, and a product 1206 is generated.

In this way, based on the pixels to which the special color ink is to be applied in the output special color ink layer 1204, the special color area is designated. The special color area includes not only pixels to which the special color ink is to be applied but also pixels to which no special color ink is to be applied, located around the pixels to which the special color ink is to be applied. Then, the process color ink is applied to the special color area. With this operation, it is possible to check the tint of the area to which the special color ink is applied and the surrounding area thereof in a similar manner to the normal printing while reducing the ink consumption amount even in a case where the product is formed using the process color as the background of the special color area.

According to the exemplary embodiments of the present disclosure, it is possible to check the tint and the function in a limited manner by performing printing using all the inks, not only the special color ink, in the decoration area, the area for which the special color ink is used, and the surrounding area thereof. In this way, it is possible to determine the tint of the target area while reducing the consumption amounts of the ink and the recording medium.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-192354, filed Nov. 30, 2022, and No. 2023-171668, filed Oct. 2, 2023, which are hereby incorporated by reference herein in their entirety.

What is claimed is:

1. An image forming apparatus comprising:
    an obtaining unit configured to obtain process color data for forming a process color using a process color ink and special color data for forming a special color, the process color data and the special color data being data to be printed on a printing medium in an overlapped manner;
    an identification unit configured to identify a special color area in the process color data, the special color area being identified based on a pixel indicating that the pixel forms the special color in the special color data;
    a generation unit configured to generate data for test printing of the process color ink by not changing an application amount of the process color ink to be applied to the special color area in the process color data and setting the application amount of the process color ink to be applied to an area other than the special color area to substantially zero; and
    an execution unit configured to execute the test printing of the special color area based on the data for the test printing of the process color ink and the special color data.

2. The image forming apparatus according to claim 1, wherein the identified special color area includes a pixel corresponding to the pixel indicating that the pixel forms the special color in the special color data.

3. The image forming apparatus according to claim 1, wherein the identified special color area includes a pixel corresponding to the pixel indicating that the pixel forms the special color and a pixel near the pixel that forms the special color in the special color data.

4. The image forming apparatus according to claim 1, wherein a value indicating the application amount of the process color ink to be applied to the special color area in the data for the test printing of the process color ink is same as a value indicating the application amount of the process color ink to be applied to the special color area in the process color data obtained by the obtaining unit.

5. The image forming apparatus according to claim 1,
    wherein a plurality of color inks is used as the process color ink, and
    wherein the process color data includes a plurality of pieces of data respectively corresponding to the plurality of color inks.

6. The image forming apparatus according to claim 1, wherein the special color is a color formed using a special color ink different from the process color ink.

7. The image forming apparatus according to claim 1, wherein the special color is a color formed using a metallic ink including metal particles.

8. The image forming apparatus according to claim 1,
    wherein the special color is a color formed using the process color ink, and
    wherein the special color data is data indicating a user color designated by a user.

9. The image forming apparatus according to claim 1, wherein the execution unit execute the test printing by merging the data for the test printing of the process color ink and the special color data.

10. The image forming apparatus according to claim 1, wherein a test image in which the process color ink is applied to the special color area in the test printing of the special color area executed by the execution unit is printed in a case where a pixel in the process color data corresponding to the pixel indicating that the pixel forms the special color in the special color data indicates that the process color ink is to be applied.

11. The image forming apparatus according to claim 1, further comprising a reception unit configured to receive a setting for performing the test printing from a user.

12. The image forming apparatus according to claim 11, wherein the reception unit is also capable of receiving a setting for performing normal printing, and wherein the generation unit is capable of generating output data for performing the normal printing.

13. The image forming apparatus according to claim 1, wherein the generation unit reduces a length of a printed image by deleting an area to which the process color ink is not to be applied when the data for the test printing of the process color ink is generated.

14. An image forming method comprising:
    obtaining process color data for forming a process color using a process color ink and special color data for forming a special color, the process color data and the special color data being data to be printed on a printing medium in an overlapped manner;
    identifying a special color area in the process color data, the special color area being identified based on a pixel indicating that the pixel forms the special color in the special color data;
    generating data for test printing of the process color ink by not changing an application amount of the process color ink to be applied to the special color area in the process color data and setting the application amount of the process color ink to be applied to an area other than the special color area to substantially zero; and
    executing the test printing of the special color area based on the data for the test printing of the process color ink and the special color data.

15. A non-transitory computer-readable storage medium storing a computer-executable program for causing a computer to execute an image forming method comprising:
    obtaining process color data for forming a process color using a process color ink and special color data for forming a special color, the process color data and the special color data being data to be printed on a printing medium in an overlapped manner;
    identifying a special color area in the process color data, the special color area being identified based on a pixel indicating that the pixel forms the special color in the special color data;
    generating data for test printing of the process color ink by not changing an application amount of the process color ink to be applied to the special color area in the process color data and setting the application amount of the process color ink to be applied to an area other than the special color area to substantially zero; and
    executing the test printing of the special color area based on the data for the test printing of the process color ink and the special color data.

* * * * *